US009768651B2

(12) United States Patent
Horng et al.

(10) Patent No.: US 9,768,651 B2
(45) Date of Patent: Sep. 19, 2017

(54) MOTOR WITH THRUST BEARING

(71) Applicant: Sunonwealth Electric Machine Industry Co., Ltd., Kaohsiung (TW)

(72) Inventors: Alex Horng, Kaohsiung (TW); Ko-Chien Wang, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 478 days.

(21) Appl. No.: 14/530,870

(22) Filed: Nov. 3, 2014

(65) Prior Publication Data

US 2015/0188386 A1 Jul. 2, 2015

(30) Foreign Application Priority Data

Dec. 31, 2013 (TW) .............................. 102149288 A

(51) Int. Cl.
| H02K 5/16 | (2006.01) |
| H02K 1/18 | (2006.01) |
| F16C 43/02 | (2006.01) |
| G11B 19/20 | (2006.01) |
| H02K 5/10 | (2006.01) |
| H02K 7/08 | (2006.01) |
| F16C 17/10 | (2006.01) |

(52) U.S. Cl.
CPC ............. *H02K 1/187* (2013.01); *F16C 43/02* (2013.01); *G11B 19/2009* (2013.01); *H02K 5/10* (2013.01); *H02K 7/085* (2013.01); *F16C 17/107* (2013.01); *F16C 2370/12* (2013.01); *H02K 2205/03* (2013.01)

(58) Field of Classification Search
CPC ......... H02K 7/085; H02K 7/086; H02K 7/088

USPC .......................... 310/67 R, 90; 384/100, 107
See application file for complete search history.

(56) References Cited

U.S. PATENT DOCUMENTS

| 7,021,829 | B2 | 4/2006 | Tamaoka |
| 7,371,010 | B2 | 5/2008 | Uenosono et al. |
| 7,625,124 | B2 | 12/2009 | Satoji et al. |
| 2004/0113501 | A1* | 6/2004 | Tokunaga ............... F16C 17/02 310/90 |
| 2005/0180668 | A1 | 8/2005 | Yazawa |

(Continued)

FOREIGN PATENT DOCUMENTS

| CN | 1796809 A | 7/2006 |
| CN | 1853051 A | 10/2006 |

(Continued)

*Primary Examiner* — Thanh Lam
(74) *Attorney, Agent, or Firm* — Alan D. Kamrath; Kamrath IP Lawfirm, P.A.

(57) ABSTRACT

A motor includes a base, a bearing sleeve, a stator, a rotating member, a thrust bearing, and a hub. The bearing sleeve is arranged with the base and has an opening end and a sealing end opposite to each other. The stator connects with the base or the bearing sleeve. The rotating member is arranged inside the bearing sleeve and includes a shaft and a limiting portion adjacent to the sealing end. A first end of the shaft connects with the limiting portion, and a second end of the shaft has a coupling portion adjacent to the opening end. The thrust bearing is arranged between the shaft and an inner surface of the bearing sleeve, so that the limiting portion is between the thrust bearing and the sealing end. The hub connects with the coupling portion of the shaft and has a permanent magnet corresponding to the stator.

16 Claims, 8 Drawing Sheets

(56) References Cited

U.S. PATENT DOCUMENTS

| | | | |
|---|---|---|---|
| 2006/0103248 A1* | 5/2006 | Tamaoka | G11B 19/2009 310/88 |
| 2006/0197395 A1* | 9/2006 | Iguchi | H02K 1/2733 310/156.43 |
| 2007/0092170 A1 | 4/2007 | Satoji et al. | |
| 2009/0152969 A1* | 6/2009 | Narita | F16C 17/10 310/90 |
| 2010/0231074 A1* | 9/2010 | Yamashita | F16C 17/107 310/90 |
| 2010/0244601 A1* | 9/2010 | Shimizu | F16C 17/107 310/90 |
| 2013/0069466 A1 | 3/2013 | Yoo et al. | |

FOREIGN PATENT DOCUMENTS

| | | |
|---|---|---|
| CN | 102386738 A | 3/2012 |
| CN | 103001350 A | 3/2013 |
| TW | 200538651 A | 12/2005 |
| TW | I279062 B | 4/2007 |
| TW | I288997 B | 10/2007 |

\* cited by examiner

MOTOR WITH THRUST BEARING

BACKGROUND OF THE INVENTION

1. Field of the Invention

The present invention generally relates to a motor with thrust bearing and, more particularly, to a motor of simple structure and easy to be assembled.

2. Description of the Related Art

Referring to FIG. 1, a sketch diagram of a conventional motor with a thrust bearing is shown, which is identified with a reference number of "9" and which has a seat 91, a stator 92 and a rotor 93. The seat 91 couples with a bearing housing 911 receiving a thrust bearing 912 and a pushing board 913 inside. The bearing housing 911 has two opposite openings for the rotor 93 to extend into the thrust bearing 912 and to couple with a lid 914 respectively. The stator 92 couples with an outer periphery of the seat 91. The rotor 93 includes a hub 931 integrally forming an annular wall 932 and a shaft 933. The annular wall 932 is positioned between the seat 91 and the bearing housing 911, to provide functions such as dust-resistance and anti-leakage of oil. The shaft 933 extends through the thrust bearing 912 and couples with the pushing board 913. Specifically, this kind of motor 9 is disclosed in patents such as a China patent application with the application number of 200410054614.4 and title of "Liquid Hydrodynamic Bearing, Main Shaft Motor, Method for Producing Rotor Assembly Recording Disc Driving Apparatus."

With the above structure, this motor 9 has to be assembled by a specific order. First, the thrust bearing 912 is inserted into the bearing housing 911. Second, the shaft 933 and the pushing board 913 are coupled to the thrust bearing 912 via the opposite openings of the bearing housing 911, with a free end of the shaft 933 fixed to the pushing board 913, to avoid disengagement of the rotor 93 from the bearing housing 911 by an axial limitation of the pushing board 913 relative to the thrust bearing 912. Finally, the lid 914 is coupled to cover one of the two openings of the bearing housing 911 and is opposite to the rotor 93. It is apparent that the above steps for assembly of the motor 9 are complex. Besides, since the connection between the shaft 933 and the pushing board 913 is inside the thrust bearing 912, it is also difficult to perform this connection smoothly.

Furthermore, it is necessary for the bearing housing 911 to have the opposite openings in order to perform the above assembly steps. This arrangement not only leads to an additional need in the lid 914 to cover the opening opposite to the rotor 93, but also results in leakage of the oil inside the thrust bearing 912 via a gap between the lid 914 and the edge of the opening.

Therefore, the conventional motor 9 has problems such as bad oil-preservation, high operation noise caused by oil-leakage, high cost of manufacture, and short lifetime. As a result, it is necessary to improve the conventional motor 9.

SUMMARY OF THE INVENTION

What is needed is a motor with a thrust bearing, which has a simple structure for easy and fast assembly, low manufacture cost and an ideal performance in oil-preservation.

In one implementation, a motor with a thrust bearing includes: a base; a bearing sleeve arranged with the base and having an opening end and a sealing end, with the opening and sealing ends opposite to each other; a stator connecting with the base or the bearing sleeve; a rotating member inserted inside the bearing sleeve and comprising a shaft and a limiting portion, wherein a first end of the shaft connects with the limiting portion, a second end of the shaft has a coupling portion, and the coupling portion is close to the opening end and away from the sealing end as well as the limiting portion is close to the sealing end and away from the opening end; a thrust bearing arranged between the shaft and an inner surface of the bearing sleeve, so that the limiting portion is between the thrust bearing and the sealing end; and a hub connecting with the coupling portion of the shaft and having a permanent magnet corresponding to the stator.

In this implementation, one or more of the following features may be included: the base having a connecting portion, a plate and a tube, the connecting portion connecting with the bearing sleeve, the tube connecting to a center part of the plate and having an axial hole extending through the tube axially, the connecting portion being in the form of a through-hole, and the stator connecting to an outer periphery of the tube.

An inner surface of the tube has a radial recess, and the hub has an annular flange extending into the tube, corresponding to the radial recess, and located between the radial recess and the outer periphery of the tube.

The annular flange is integrally formed on a surface of the hub, with the surface facing the bearing sleeve.

The hub has a plurality of engaging holes, and the hub integrally forms the annular flange via the engaging holes.

An end surface of the tube adjacent to the opening end has an annular groove, and the hub has an annular flange extending into the annular groove.

The shaft having a maximum outer diameter, the limiting portion having another maximum outer diameter, and the maximum outer diameter of the limiting portion being larger than the maximum outer diameter of the shaft.

A surface of the sealing end inside the bearing sleeve has a plurality of supports, with the limiting portion of the rotating member abutting against the plurality of supports. Alternatively, the thrust bearing has one end abutting against the plurality of supports.

The base comprises a plate, the bearing sleeve comprises a shaft tube, the shaft tube is integrally formed with the plate, and the stator couples with an outer surface of the shaft tube. An inner sleeve may be preferably arranged inside the shaft tube, and the inner sleeve has a radial protrusion between the thrust bearing and the sealing end. A gap is formed between the limiting portion and the thrust bearing. The inner sleeve is preferably integrally formed with the shaft tube. The base and the bearing sleeve are preferably integrally formed with each other as a single piece.

Based on the above structures, the assembly of the motor can be achieved by simply disposing the rotating member and the thrust bearing into the bearing sleeve via the opening end and coupling the hub with the shaft of the rotating member. Therefore, the assembly process is simple. In addition, the bearing sleeve has one end being a sealing end. Overall, the motor has advantages such as convenient assembly, low manufacturing cost and high oil-preserving effect.

BRIEF DESCRIPTION OF THE DRAWINGS

The present invention will become more fully understood from the detailed description given hereinafter and the accompanying drawings which are given by way of illustration only, and thus are not limitative of the present invention, including:

FIG. 1 is a sketch diagram of a conventional motor with a thrust bearing.

Figure 1:
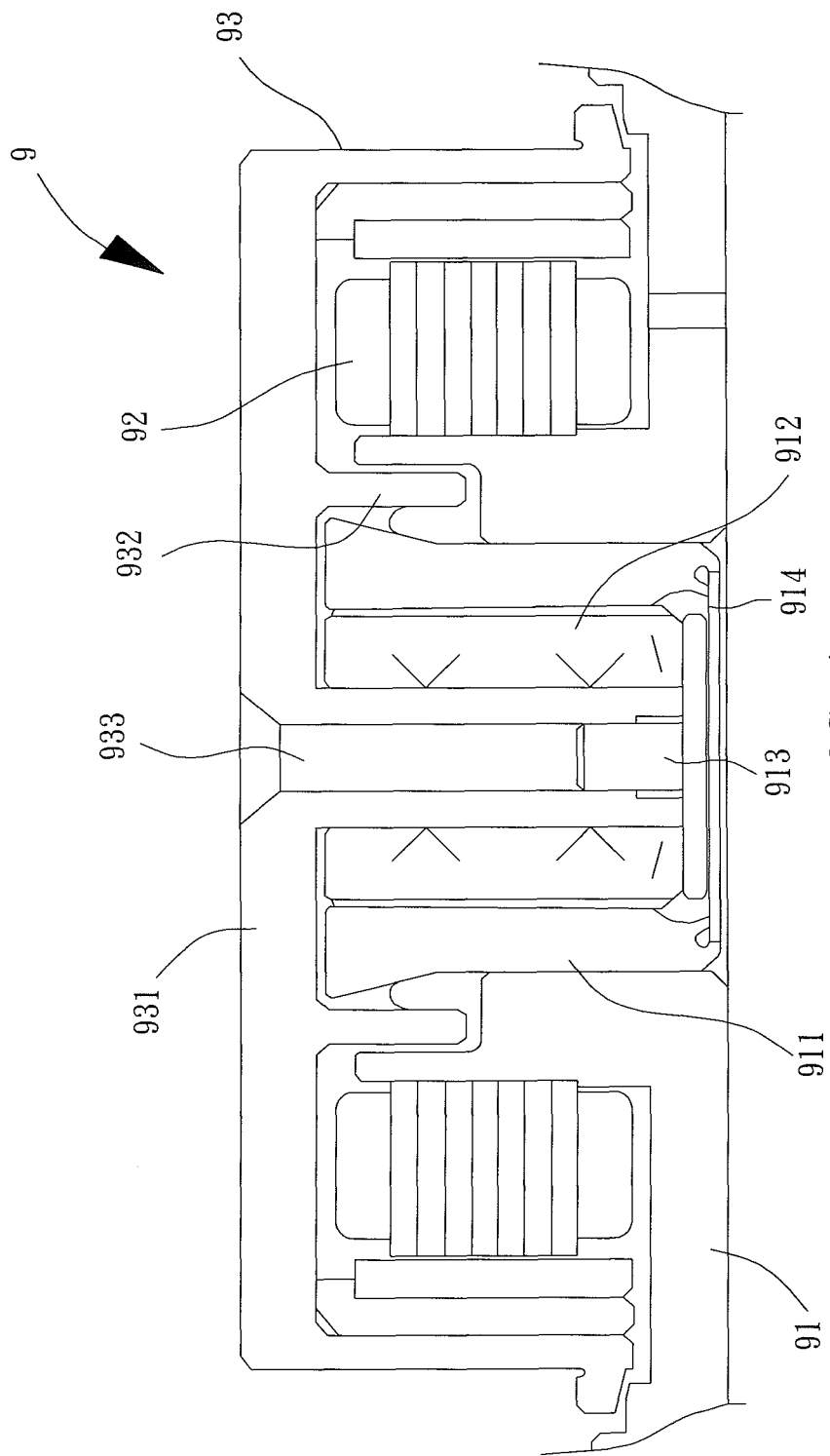

In the various figures of the drawings, the same numerals designate the same or similar parts. Furthermore, when the term "first," "second," "inner," "outer" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

Figure 2:
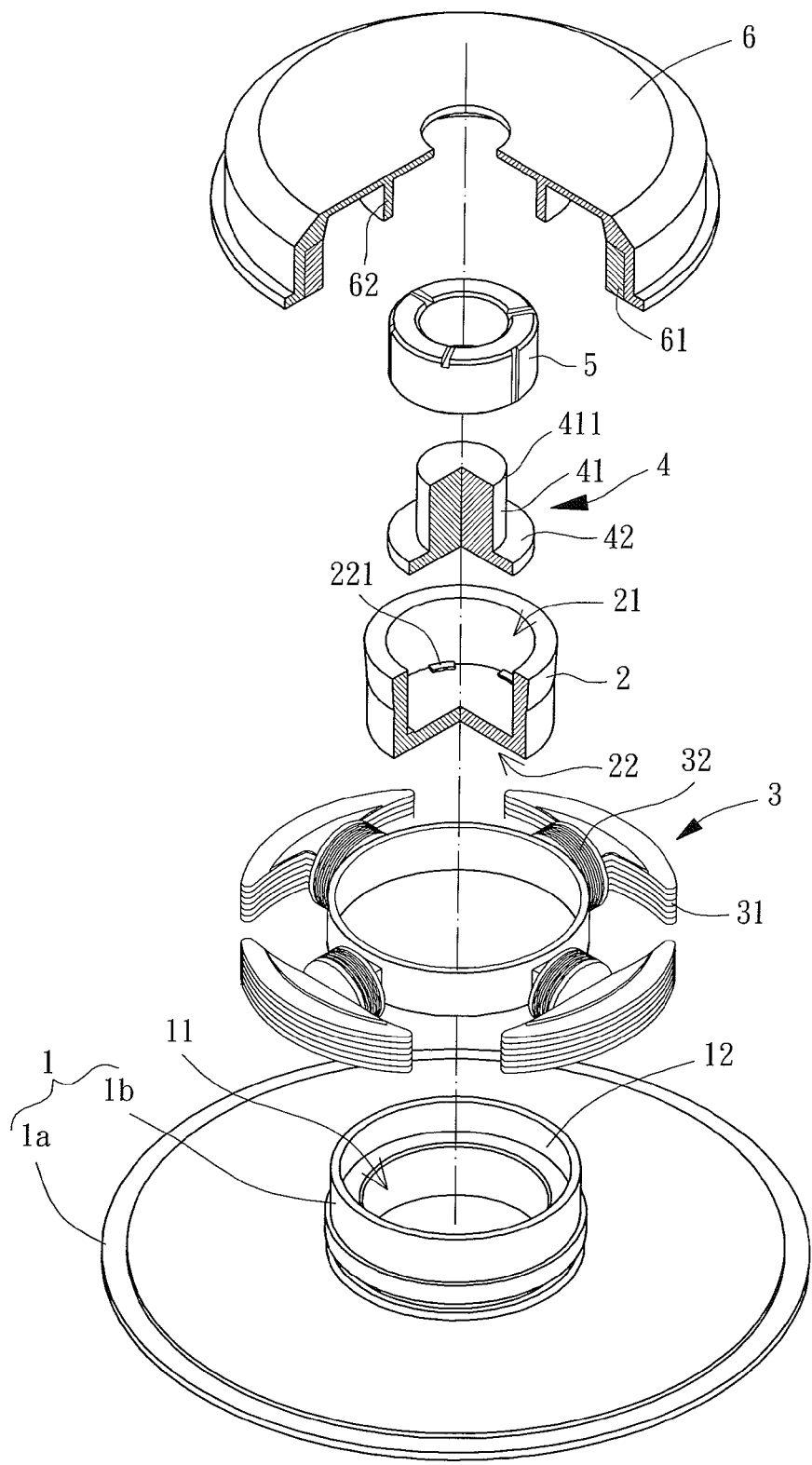
FIG. 2 is a perspective view of a motor with a thrust bearing according to a preferable embodiment of the present invention.

Referring to FIG. 2, a preferred embodiment of a motor with a thrust bearing of the present invention is shown and includes a base 1, a bearing sleeve 2, a stator 3, a rotating member 4, a thrust bearing 5, and a hub 6. The bearing sleeve 2 and the stator 3 connect with the base 1, the bearing sleeve 2 receives the rotating member 4 and the thrust bearing 5, and the hub 6 couples with the rotating member 4.

Specifically, the base 1 has a connecting portion 11 that can be of any structure for connecting with the bearing sleeve 2. Furthermore, the base 1 may include a plate 1a and a tube 1b, and the tube 1b connects to a center part of the plate 1a. The tube 1b has an axial hole extending therethrough axially. The connecting portion 11 is in the form of a through-hole inside which the bearing sleeve 2 can be engaged.

Figure 7:
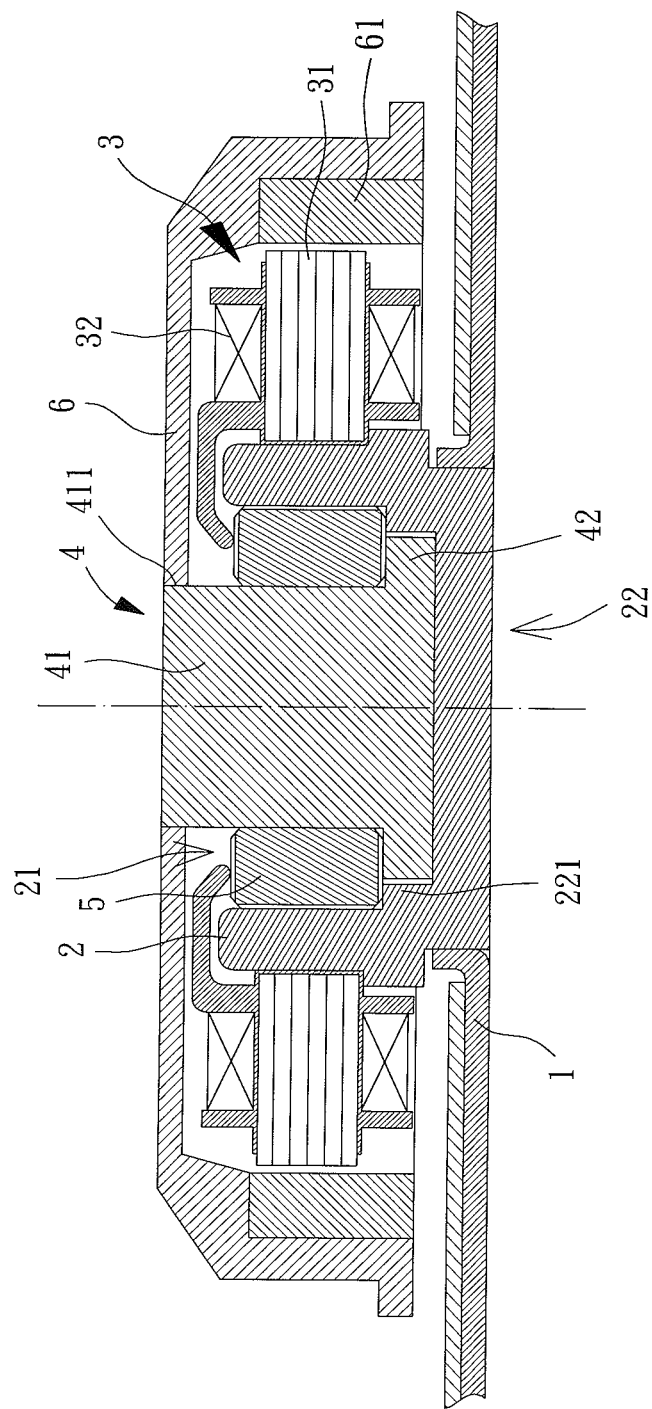
FIG. 7 is a cross-sectional view of the motor with the thrust bearing of the preferable embodiment, with supports abutting against the thrust bearing.

The bearing sleeve 2 couples with the connecting portion 11 of the base 1 and can be of any structure capable of receiving the rotating member 4 and the thrust bearing 5. The bearing sleeve 2 has an opening end 21 and a sealing end 22, with the sealing end 22 coupling to the connecting portion 11 of the base 1. Preferably, a surface of the sealing end 22 inside the bearing sleeve 2 has a plurality of supports 221 for supporting the rotating member 4 as well as for decreasing the contacting area between the rotating member 4 and the sealing end 22 to improve the rotation of the rotating member 4. Alternatively, instead of supporting the rotating member 4, the supports 221 can be arranged to support the thrust bearing 5 as shown in FIG. 7, so as not to affect the operation of the rotating member 4. Furthermore, in order to simplify the structure of the disclosed motor, the bearing sleeve 2 and the base 1 can be integrally formed with each other as a single piece.

The stator 3 connects with one of the base 1 and the bearing sleeve 2 and is in a structure for driving the hub 6. Preferably, the stator 3 is arranged around the tube 1b and connects to an outer periphery of the tube 1b. The stator 3 includes a silicon steel member 31 and a coil 32 winding around the silicon steel member 31. The silicon steel member 31 can be in the form of a pile of silicon steel plates or a single silicon steel plate.

The rotating member 4 is inserted inside the bearing sleeve 2 and includes a shaft 41 and a limiting portion 42, the limiting portion 42 is integrally formed at or detachably connects to a first end of the shaft 41, and a second end of the shaft 41 has a coupling portion 411. Specifically, the rotating member 4 is arranged inside the bearing sleeve 2 in a way that the coupling portion 411 is close to the opening end 21 but away from the sealing end 22, as well as the limiting portion 42 is close to the sealing end 22 but away from the opening end 21. Particularly, in radial directions of the rotating member 4, which are perpendicular to an axial direction of the rotating member 4, each of the shaft 41 and limiting portion 42 has a maximum outer diameter, and the maximum outer diameter of the limiting portion 42 is preferably larger than that of the shaft 41. As such, it can better prevent the disengagement of the rotating member 4.

The thrust bearing 5 is also inserted inside the bearing sleeve 2 and between the shaft 41 and an inner surface of the bearing sleeve 2. Therefore, with the thrust bearing 5, the rotating member 4 can stably rotate inside the bearing sleeve 2. Besides, the limiting portion 42 can extend into a gap between the thrust bearing 5 and the sealing end 22 and be axially positioned therein, since the maximum outer diameter of the limiting portion 42 is preferably larger than that of the shaft 41. Therefore, the rotating member 4 does not easily fall out of the bearing sleeve 2.

The hub 6 can connect with the coupling portion 411 of the shaft 41 by a conventional way such as welding (laser welding or the like), adhesion, screwing, or press-fitting. The hub 6 has a permanent magnet 61 corresponding to the stator 3; namely, the permanent magnet 61 has a pole surface facing to and spaced from the stator 3. In operation, the hub 6 can be driven to rotate by the magnetic field generated by the stator 3.

Figure 3:
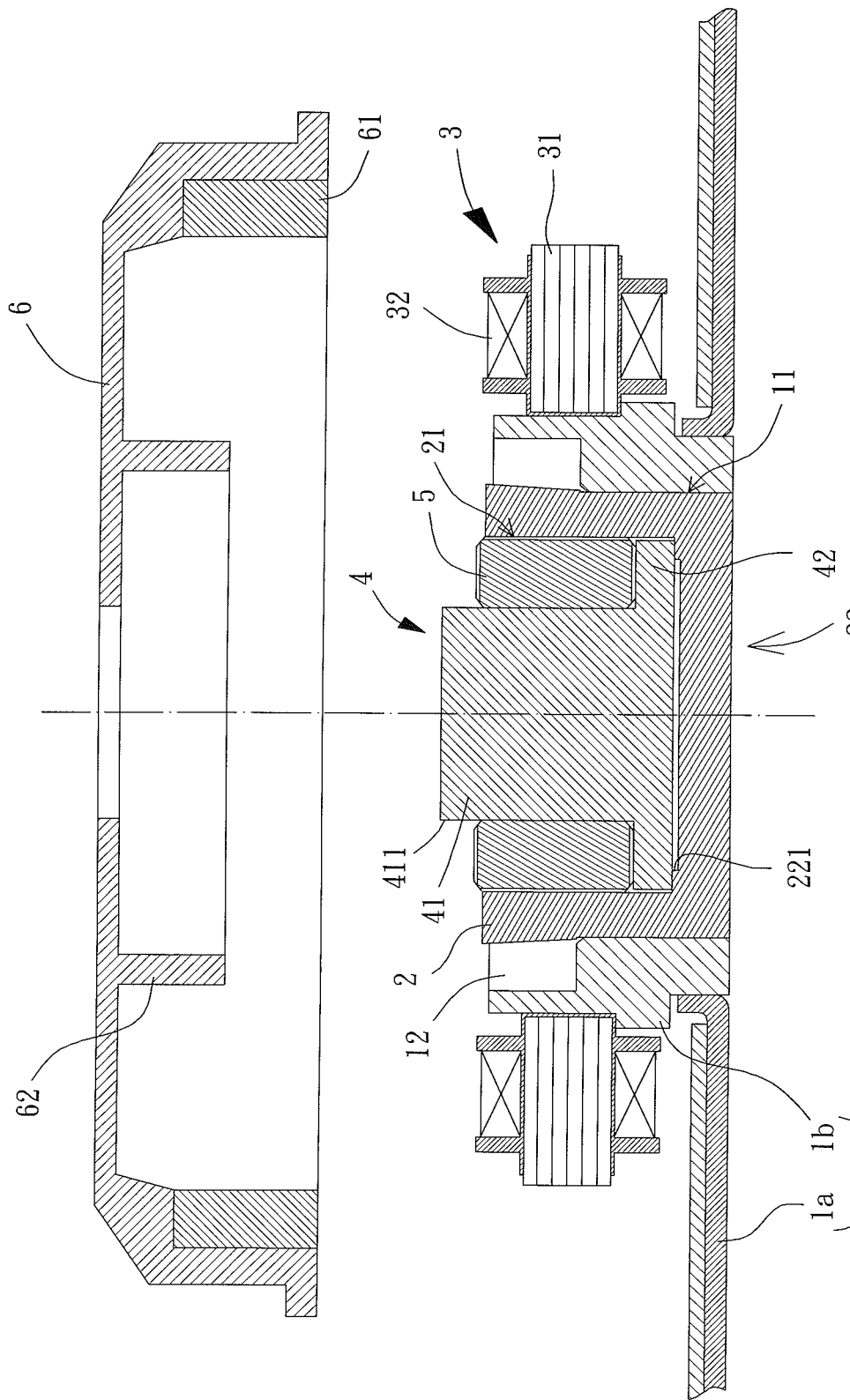
FIG. 3 is a cross-sectional view of the motor with the thrust bearing of the preferable embodiment before assembly of a hub.
Figure 4:
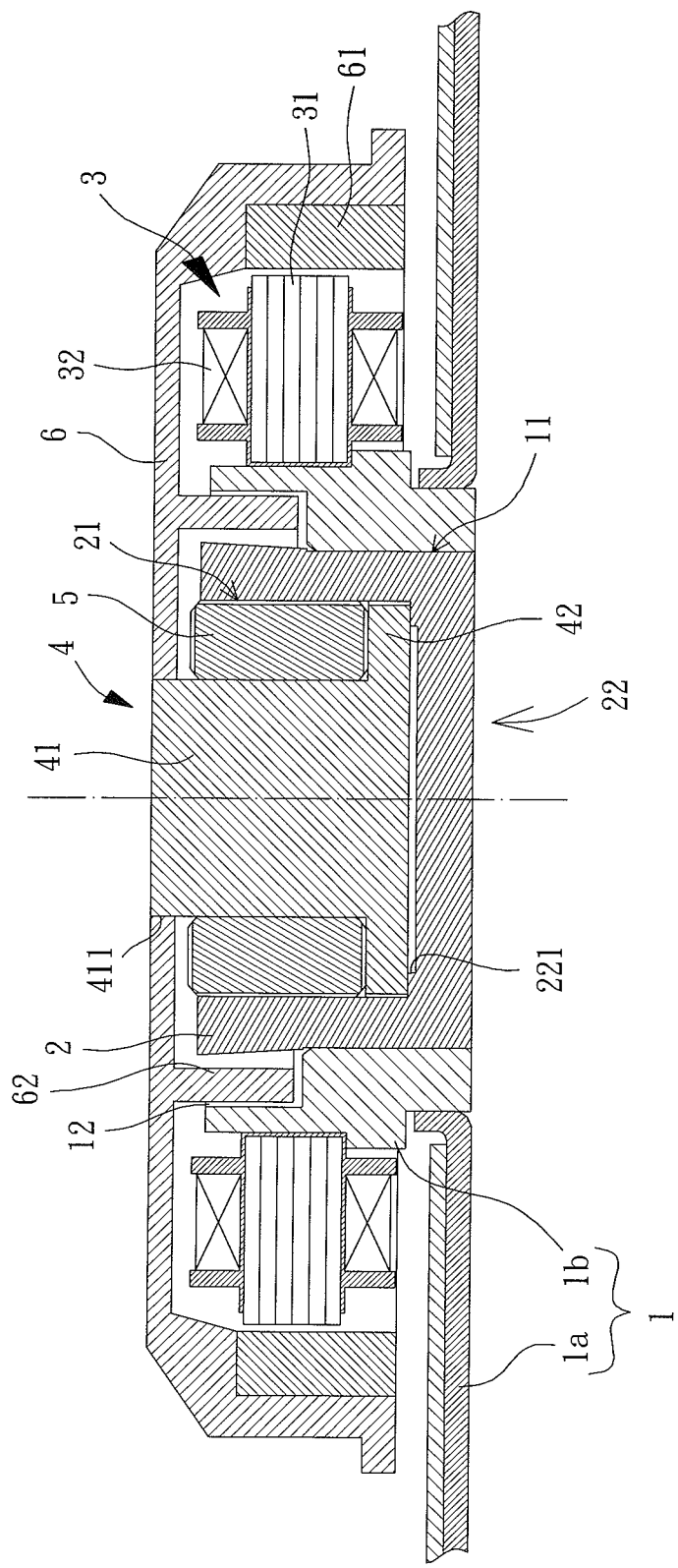
FIG. 4 is a cross-sectional view of the motor with the thrust bearing of the preferable embodiment after assembly of the hub.

Referring to FIGS. 3 and 4, in assembly of the disclosed motor, the rotating member 4 and the thrust bearing 5 are inserted into the bearing sleeve 2 via the opening end 21, with the limiting portion 42 abutting against the supports 221 and delimited between the thrust bearing 5 and the sealing end 22. Accordingly, once the thrust bearing 5 is firmly fixed inside the bearing sleeve 2 by press fitting, disengagement of the rotating member 4 relative to the bearing sleeve 2 is prevented (without hindering the rotation of the rotating member 4). In this arrangement, it can prevent the rotating member 4 from disengaging from the bearing sleeve 2 via the opening end 21. In addition to the above process, the assembly of the disclosed motor can be completed by coupling the stator 3 to the tube 1b of the base 1 and fixing the hub 6 to the shaft 41.

Specifically, referring to FIG. 4 again, an inner surface of the tube 1b may has a radial recess 12, and a surface of the hub 6, which faces the bearing sleeve 2, may have an annular flange 62 extending into the tube 1b and corresponding to the radial recess 12. Therefore, the annular flange 62 adjacent to the opening end 21 and located between the radial recess 12 and the bearing sleeve 2 can efficiently achieve functions such as dust-resistance and oil preservation.

Figure 5:
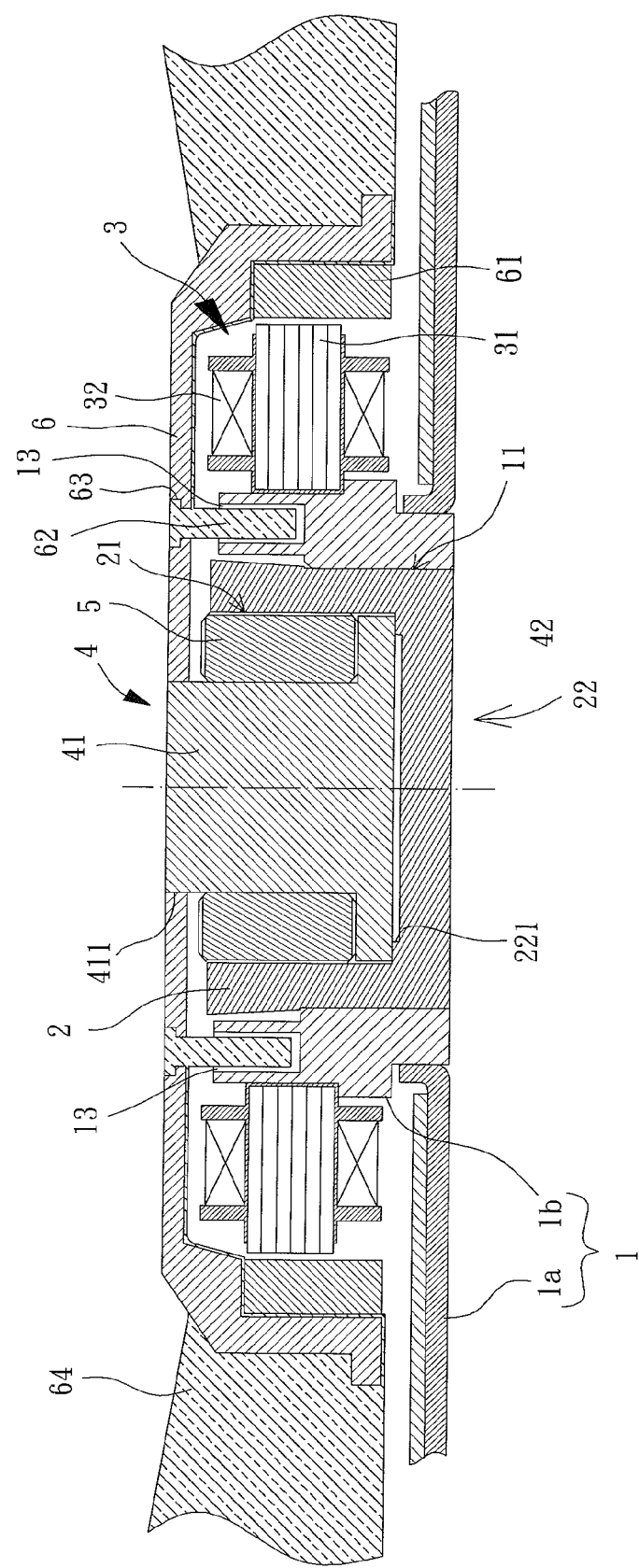
FIG. 5 is a cross-sectional view of the motor with the thrust bearing of the preferable embodiment, with the motor serving as a fan motor.

Moreover, please refer to FIG. 5 now. It is preferable that an end surface of the tube 1b facing the hub 6 and adjacent to the opening end 21 has an annular groove 13, and the hub 6 has a plurality of engaging holes 63. Accordingly, when a plurality of blades 64 is formed around the hub 6 by a single injection molding process to provide a fan wheel, the annular flange 62 can be integrally formed with the plurality of blades 64 through the plurality of engaging holes 63 during the injection molding process, achieving easy formation of the annular flange 62. In the above arrangement, the hub 6 may also cover the permanent magnet 61 as shown in FIG. 5. Moreover, since the annular flange 62 may extend into the annular groove 13, it can prevent dust from entering the motor as well as prevent oil leakage.

Figure 6A:
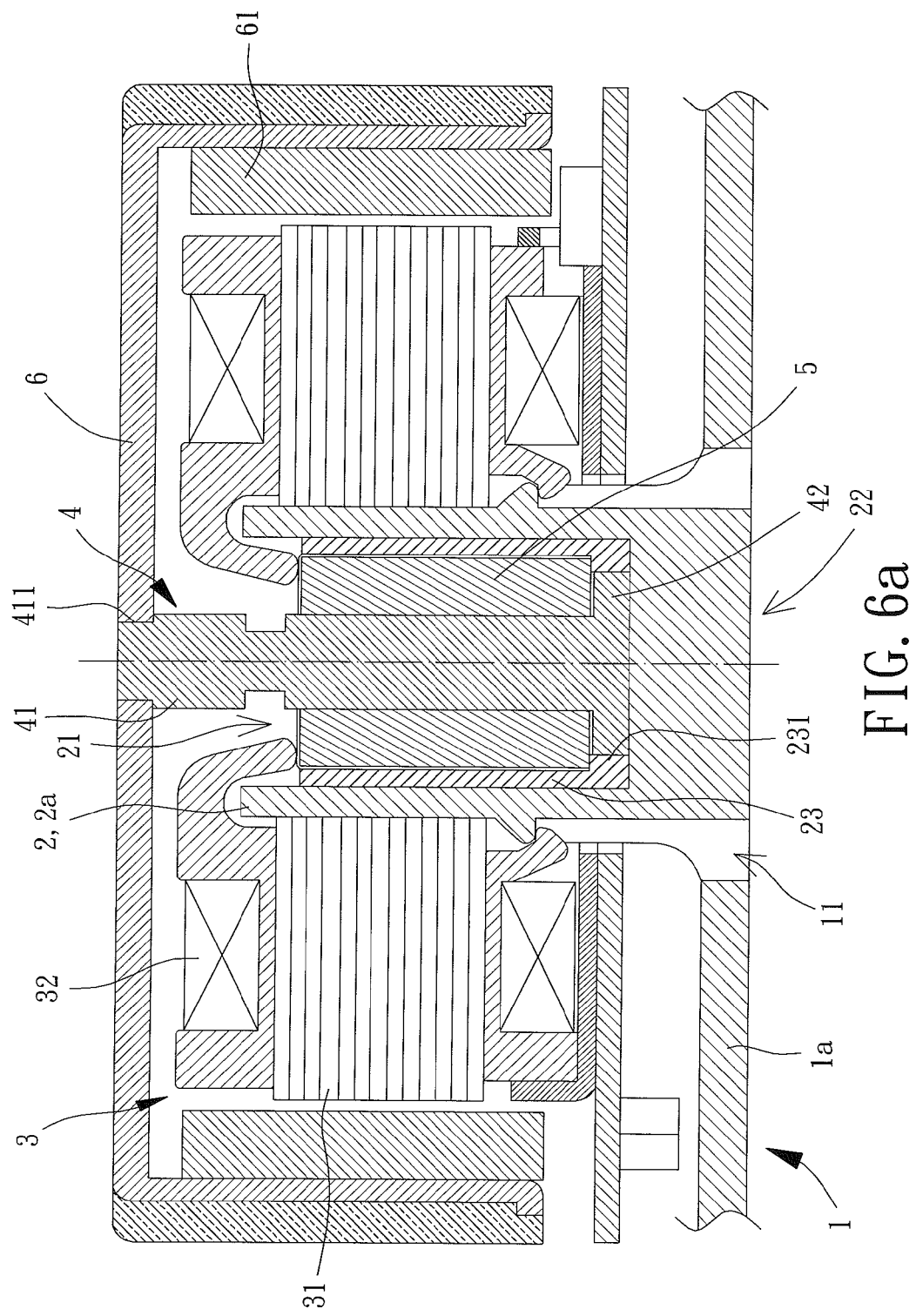
FIG. 6a is a cross-sectional view of the motor with the thrust bearing of the preferable embodiment, with an inner sleeve arranged inside a shaft tube serving as a bearing sleeve.
Figure 6B:
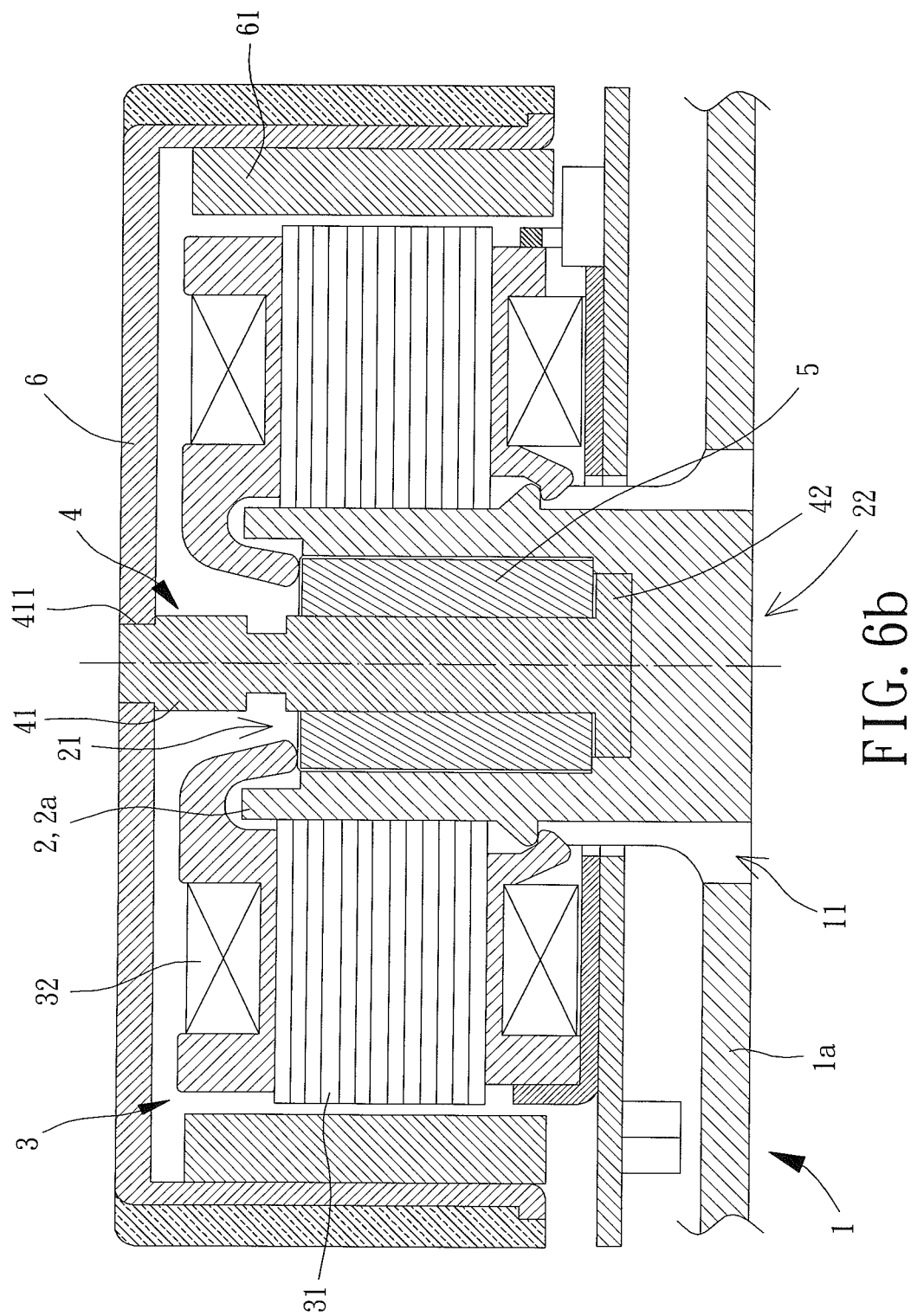
FIG. 6b is a cross-sectional view of the motor with the thrust bearing of the preferable embodiment, with the inner sleeve and the shaft tube integrally formed with each other as the bearing sleeve.

Referring to FIG. 6a, instead of including both the plate 1a and the tube 1b, the base 1 may have the plate 1a only. Furthermore, the bearing sleeve 2 serves as a shaft tube 2a integrally formed with the plate 1a via the connecting portion 11, so that the base 1 and the bearing sleeve 2 form an one-piece element having a simplified and easy-to-assembling structure. The stator 3 couples with an outer surface of the shaft tube 2a. Preferably, there is an inner sleeve 23 inside the shaft tube 2a, with the inner sleeve 23 having a radial protrusion 231 between the thrust bearing 5 and the sealing end 22, to form a gap between the limiting portion 42 and the thrust bearing 5 for decreasing interference therebetween. Specifically, the inner sleeve 23 can also be integrally formed with the shaft tube 2a as shown in FIG. 6b.

In sum, with the above structure, processes for assembly of the disclosed motor merely include inserting the rotating member 4 and the thrust bearing 5 into the bearing sleeve 2 via the opening end 21, coupling the stator 3 with the base 1, and connecting the hub 6 with the shaft 41 of the rotating member 4. Therefore, the processes for assembly of a motor with thrust bearing are apparently simplified in comparison with those of the conventional one. Besides, the present invention also provides a structure simpler than that of the conventional motor with a thrust bearing, to decrease the cost of manufacture.

Moreover, with the sealing end 22 of the bearing sleeve 2, the lubricating oil inside the bearing sleeve 2 for smooth operation of the thrust bearing 5 can be maintained, and, thus, the present invention can have a desirable oil-preserving performance, low operational noise, and increased lifetime.

Although the invention has been described in detail with reference to its presently preferable embodiments, it will be understood by one of ordinary skill in the art that various modifications can be made without departing from the spirit and the scope of the invention, as set forth in the appended claims.

What is claimed is:
1. A motor with thrust bearing, comprising:
   a base;
   a bearing sleeve arranged with the base and having an opening end and a sealing end, with the opening and sealing ends opposite to each other;
   a stator connecting with the base or the bearing sleeve;
   a rotating member arranged inside the bearing sleeve and comprising a shaft and a limiting portion, wherein a first end of the shaft connects with the limiting portion, a second end of the shaft has a coupling portion, and the coupling portion is close to the opening end and away from the sealing end as well as the limiting portion is close to the sealing end and away from the opening end;
   a thrust bearing arranged between the shaft and an inner surface of the bearing sleeve, wherein the limiting portion is between the thrust bearing and the sealing end; and
   a hub connecting with the coupling portion of the shaft and having a permanent magnet corresponding to the stator.

2. The motor with thrust bearing as claimed in claim 1, wherein the base has a connecting portion, a plate and a tube, the connecting portion connects with the bearing sleeve, the tube connects to a center part of the plate and has an axial hole extending through the tube axially, the connecting portion is in a form of a through-hole, and the stator connects to an outer periphery of the tube.

3. The motor with thrust bearing as claimed in claim 2, wherein an inner surface of the tube has a radial recess, and the hub has an annular flange extending into the tube, corresponding to the radial recess, and located between the radial recess and the outer periphery of the bearing sleeve.

4. The motor with thrust bearing as claimed in claim 3, wherein the annular flange is integrally formed on a surface of the hub, with the surface facing the bearing sleeve.

5. The motor with thrust bearing as claimed in claim 3, wherein the hub has a plurality of engaging holes, and the hub integrally forms the annular flange via the engaging holes.

6. The motor with thrust bearing as claimed in claim 2, wherein an end surface of the tube adjacent to the opening end has an annular groove, and the hub has an annular flange extending into the annular groove.

7. The motor with thrust bearing as claimed in claim 6, wherein the annular flange is integrally formed on a surface of the hub, with the surface facing the bearing sleeve.

8. The motor with thrust bearing as claimed in claim 6, wherein the hub has a plurality of engaging holes, and the annular flange engages with the engaging holes.

9. The motor with thrust bearing as claimed in claim 1, wherein the shaft has a maximum outer diameter, the limiting portion has another maximum outer diameter, and the maximum outer diameter of the limiting portion is larger than the maximum outer diameter of the shaft.

10. The motor with thrust bearing as claimed in claim 1, wherein a surface of the sealing end inside the bearing sleeve has a plurality of supports, and the limiting portion of the rotating member abuts against the plurality of supports.

11. The motor with thrust bearing as claimed in claim 1, wherein a surface of the sealing end inside the bearing sleeve has a plurality of supports, and the thrust bearing has one end abutting against the plurality of supports.

12. The motor with thrust bearing as claimed in claim 1, wherein the base comprises a plate, the bearing sleeve is a shaft tube, the shaft tube integrally connects with the plate, and the stator couples with an outer surface of the shaft tube.

13. The motor with thrust bearing as claimed in claim 12, wherein an inner sleeve is arranged inside the shaft tube, and the inner sleeve has a radial protrusion between the thrust bearing and the sealing end.

14. The motor with thrust bearing as claimed in claim 13, wherein the inner sleeve is integrally formed with the shaft tube.

15. The motor with thrust bearing as claimed in claim 13, wherein a gap is formed between the limiting portion and the thrust bearing.

16. The motor with thrust bearing as claimed in claim 1, wherein the base and the bearing sleeve are integrally formed with each other as a single piece.

* * * * *